(12) United States Patent
Lee et al.

(10) Patent No.: US 8,938,673 B2
(45) Date of Patent: Jan. 20, 2015

(54) METHOD AND APPARATUS FOR EDITING HOME SCREEN IN TOUCH DEVICE

(75) Inventors: Sang Ki Lee, Seoul (KR); Su Jung Youn, Gyeonggi-do (KR); Kyoung Ae Lim, Seoul (KR); Su Mi Shim, Gyeonggi-do (KR); Wan Soo Lim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 372 days.

(21) Appl. No.: 13/241,807

(22) Filed: Sep. 23, 2011

(65) Prior Publication Data

US 2012/0079432 A1   Mar. 29, 2012

(30) Foreign Application Priority Data

Sep. 24, 2010   (KR) .................. 10-2010-0092840

(51) Int. Cl.
  *G06F 3/00*   (2006.01)
  *G06F 3/0488*   (2013.01)
  *G06F 3/0483*   (2013.01)
  *H04M 1/725*   (2006.01)

(52) U.S. Cl.
  CPC .......... *G06F 3/04883* (2013.01); *G06F 3/0483* (2013.01); *H04M 1/72544* (2013.01); *H04M 2250/22* (2013.01)
  USPC ........................................... 715/273; 715/838

(58) Field of Classification Search
  USPC ............... 715/234, 243, 254, 255, 273, 828
  See application file for complete search history.

(56) References Cited

U.S. PATENT DOCUMENTS 7,844,918 B1 * 11/2010 Ashe ............................. 715/838
8,458,615 B2 *  6/2013 Chaudhri ...................... 715/803

FOREIGN PATENT DOCUMENTS

| KR | 10-0861656 B1 | 10/2008 |
| KR | 10-0880126 B1 | 10/2008 |
| KR | 10-2010-0043613 A | 4/2010 |
| KR | 10-2010-0093909 A | 8/2010 |

* cited by examiner

*Primary Examiner* — Kyle Stork
(74) *Attorney, Agent, or Firm* — Cha-Reiter, LLC

(57) ABSTRACT

A method and apparatus for editing the home screen in a touch-enabled device enables the touch-enabled device to move a content item between pages of the home screen in an easy and intuitive way by: displaying a selected page as a current home screen; detecting a first interaction in the course of utilizing the home screen; displaying, when the first interaction is a page transition interaction, a transition mode screen; detecting a second interaction for moving a content item between pages while the transition mode screen is displayed; and moving the content item to a target page indicated by the second interaction.

20 Claims, 7 Drawing Sheets

METHOD AND APPARATUS FOR EDITING HOME SCREEN IN TOUCH DEVICE

CLAIM OF PRIORITY

This application claims the benefit under 35 U.S.C. §119 of a Korean Patent Application filed in the Korean Intellectual Property Office on Sep. 24, 2010 and assigned Ser. No. 10-2010-0092840, the entire disclosure of which is hereby incorporated by reference.

BACKGROUND OF THE INVENTION

1. Field of the Invention

The present invention relates to a device supporting a touch-based input interface and, more particularly, to a method and apparatus that enable a touch-enabled device to support intuitive and easy movement of content between pages when editing the home screen.

2. Description of the Related Art

Rapid advances in communication technologies and semiconductor technologies have enabled widespread popularization of mobile terminals. Particularly, high-end mobile terminals have evolved into mobile convergence devices supporting heterogeneous functions originating from distinct fields. For example, mobile communication terminals may support not only voice and data communication functions but also other multimedia functions such as mobile broadcast reception via DMB or DVB, music playback using an MP3 player, photography, Internet access, and dictionary search.

Many mobile terminals are increasingly equipped with a touch screen, which supports both a display means for displaying operating status and an input means for entering data, and thus function as touch-enabled devices. Typical touch-enabled devices are provided as full touch screen type devices without physical alphanumeric keys. As such, they are operated and controlled through an input interface based on touch gestures.

Various hardware or software techniques are continuously applied to touch-enabled devices. For example, new mechanisms are constantly added to user interface (UI) environments of touch-enabled devices to enhance ease of use and support new functions.

SUMMARY OF THE INVENTION

The present invention provides a touch-enabled device with a supplementary function for enhancing user convenience.

The present invention also provides a touch-enabled device with a user interface environment that enables the user to configure content items in the home screen in an intuitive and easy way through touch-based interaction.

The present invention further provides a touch-enabled device and a control method for the same that enables a content item to be moved between pages constituting the home screen according to user interaction during home screen editing.

The present invention further provides a touch-enabled device with an intuitive interface that enables movement of a content item between pages to enhance usability and convenience of the device during home screen editing.

In accordance with an exemplary embodiment of the present invention, a home screen management method in a touch-enabled device includes: displaying a selected page as a current home screen; detecting a first interaction in the course of utilizing the home screen; displaying, when the first interaction is a page transition interaction, a transition mode screen; detecting a second interaction for moving a content item between pages while the transition mode screen is displayed; and moving the content item to a target page indicated by the second interaction.

In accordance with another exemplary embodiment of the present invention, there is provided computer readable storage media that contain computer programs implementing the home screen management method.

In accordance with another exemplary embodiment of the present invention, a touch-enabled device includes: a touch screen displaying a home screen composed of one or more pages and receiving an interaction for moving a content item between pages via the home screen; and a control unit controlling, in the course of utilizing a selected page as a current home screen, the process of moving a content item between pages in response to a page transition interaction.

The home screen may include a transition region to be used to perform a transition mode operation for moving a content item from one page to another page. The transition region may be provided at a region of the home screen, and may be realized using at least one of a device indicator region, a page indicator region and a page region.

In a feature of the present invention, the method and apparatus for editing the home screen enable a touch-enabled device to move a content item between pages in an easy and intuitive way according to touch-based user interaction during home screen editing. The method and apparatus may be realized in any device having a touch input interface. During home screen editing, a content item may be moved between pages according to simple touch-based user interaction. The method and apparatus may simplify complex steps of an existing approach to home screen editing, and may provide an optimal environment for home screen editing and page transitions of a content item in a touch-enabled device.

In addition, the method and apparatus for editing the home screen enable multiple content items to be moved at once to another page of the home screen. When a content item is moved from a first page to a second page, the first page may remain as the current page or the second page may be set to the new current page according to user settings or selection. Hence, the method and apparatus may increase the level of flexibility in configuration of the home screen and movement of a content item between pages. The method and apparatus may provide an easy and intuitive interface for home screen editing and page transitions of a content item in a touch-enabled device, and hence may increase the level of usability, convenience and competitiveness of the touch-enabled device.

Hereinabove, the features and advantages of the present invention have been described in a relatively broad perspective to help those skilled in the art understand the present invention. Other features and advantages constituting the subject matter of the present invention will be more apparent from the following detailed description.

BRIEF DESCRIPTION OF THE DRAWINGS

The features and advantages of the present invention will be more apparent from the following detailed description in conjunction with the accompanying drawings, in which.

DETAILED DESCRIPTION

Hereinafter, exemplary embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the present invention.

The present invention relates to an apparatus and control method for the same that enable a touch-enabled device having a touch-based input interface to support editing of the home screen in a sensible and intuitive manner. In the embodiment, one or more content items may be moved between pages in the home screen of the touch-enabled device according to user interactions based on single or multi-touch gestures, and may be placed in a particular page according to a preset rule.

According to the teachings of the present invention, a user's interactions for movement of a content item between pages may be made according to preset approaches and input schemes for user interactions are described later. In the embodiment, the home screen may include multiple pages, each of which corresponds to a screen composed of one or more content items such as short-cut icons associated with applications, widget icons and folders.

Next, a description is given of the configuration and operation of a touch-enabled device with reference to the drawings. However, it should be noted that the configuration and operation thereof are not limited to or by the following description, and various changes and modifications are possible on the basis of the following description.

Figure 1:
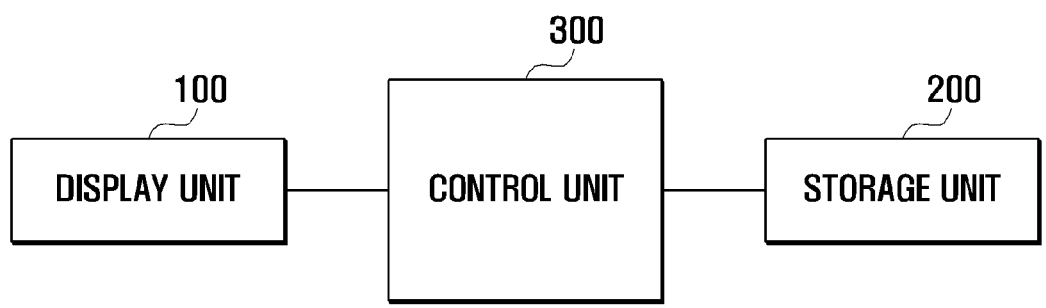
FIG. 1 is a block diagram of a touch-enabled device according to an exemplary embodiment of the present invention.

FIG. 1 is a block diagram of a touch-enabled device according to an exemplary embodiment of the present invention.

Referring to FIG. 1, the touch-enabled device includes a display unit 100, a storage unit 200, and a control unit 300. Although not shown, the touch-enabled device may further include various components, such as a radio frequency unit for mobile communication, an audio processing unit including a microphone and a speaker, a camera module for taking photographs, a digital broadcast receiving module for DMB (Digital Multimedia Broadcasting) or DVB (Digital Video Broadcasting), a camera module for capturing still and moving images, a Bluetooth module for Bluetooth communication, an Internet module for Internet access, a touch pad for entering touch-based inputs, and an input unit for physical key inputs. These additional components are not described further as they are well known in the art and not to obscure the subject matter of the present invention.

The display unit 100 displays the home screen and application screens of the touch-enabled device. For example, an application screen may include icons or items related to messages, e-mail, Internet, multimedia, search, communication, e-books, moving images, image capture, mobile television such as DMB or DVB, music players such as MP3 players, widgets, memos and games. The display unit 100 may be realized using liquid crystal display (LCD) devices, light emitting diodes (LED), organic LEDs (OLED) or active matrix OLEDs (AMOLED). The display unit 100 may display screens in portrait mode or landscape mode according to the orientation of the touch-enabled device.

In the embodiment, the display unit 100 may have a touch-based input interface. For example, the display unit 100 may have a touchscreen capability to support touch-based user interaction, and may generate an input signal corresponding to a user interaction and send the input signal to the control unit 300. In operation, the display unit 100 may display the home screen, and may move one or more content items from one page to another page in the home screen according to touch-based user interaction. To support the movement of a content item between pages, the display unit 100 may place a transition region at a portion of the home screen. A detailed description relating to movement of content items between pages according to user interaction and arrangement of content items are described later with reference to figures.

The storage unit 200 stores various programs and associated data related to operation of the touch-enabled device. The storage unit 200 may be composed of one or more volatile memory elements or nonvolatile memory elements. For example, the storage unit 200 may temporarily or permanently store the operating system of the touch-enabled device, programs and data related to display control operation of the display unit 100, programs and data related to input control operation using the display unit 100, programs and data related to the movement of a content item between pages, and programs and data related to edit mode operation of the home screen according to user interaction.

The control unit 300 controls the overall operation of the touch-enabled device. In particular, the control unit 300 may control an operation to support editing of the home screen. The control unit 300 may control an operation to move a content item between pages during editing of the home screen. For example, the control unit 300 may set a requested one of multiple pages as the home screen. The control unit 300 may control page transitions according to a user interaction, and may set the target page as the home screen. When a touch-based user interaction is generated on the home screen, the control unit 300 determines whether the touch-based user interaction is related to movement of a content item between pages or to regular operation control. Here, a touch-based user interaction for the movement of a content item between pages may be determined by checking whether the touch-based user interaction has been generated via a preset transition region.

When the touch-based user interaction is a page transition interaction for movement of a content item between pages, the control unit 300 controls an operation to move at least one content item associated with the interaction from a first page to a second page and may arrange the moved content item within the second page according to a preset rule. Here, when the content item is moved from the first page (current page) to the second page, the control unit 300 may maintain the existing current page or may set the second page as the new current page. The control unit 300 may control the movement of a single content item according to a single-touch based user interaction or control movement of multiple content items according to a multi-touch based user interaction. Control operations of the control unit 300 are described in more detail with reference to figures.

Further, the control unit 300 may control various regular operations of the touch-enabled device. For example, when an application is activated, the control unit 300 may control execution and data display of the application. The control unit 300 may receive various input signals generated by the touch-based input interface and control operations according to the input signals. During editing of the home screen, the control unit 300 may control the movement of a content item within the current page and control an operation to delete a content item, update a content item, and change the name of a content item.

The touch-enabled device of FIG. 1 may be any mobile terminal having a touch-based input interface, such as a bar type mobile terminal, a folder type mobile terminal, a slide type mobile terminal, a swing type mobile terminal or a flip type mobile terminal. The touch-enabled device of the present invention may be any information and communication appliance or multimedia appliance, such as a mobile communication terminal based on communication protocols supporting various communication systems, a tablet personal computer, a portable multimedia player (PMP), a digital broadcast receiver, a personal digital assistant (PDA), a music player like an MP3 player, a portable game console, a netbook computer, or a smart phone.

It should be noted that the teachings of the present invention, in particular to controlling the movement of a content item between pages according to user interactions based on a touch-based input interface may be applied to various appliances such as a television set, a large format display (LFD), digital signage (DS), a media kiosk and a laptop computer.

Figure 2:
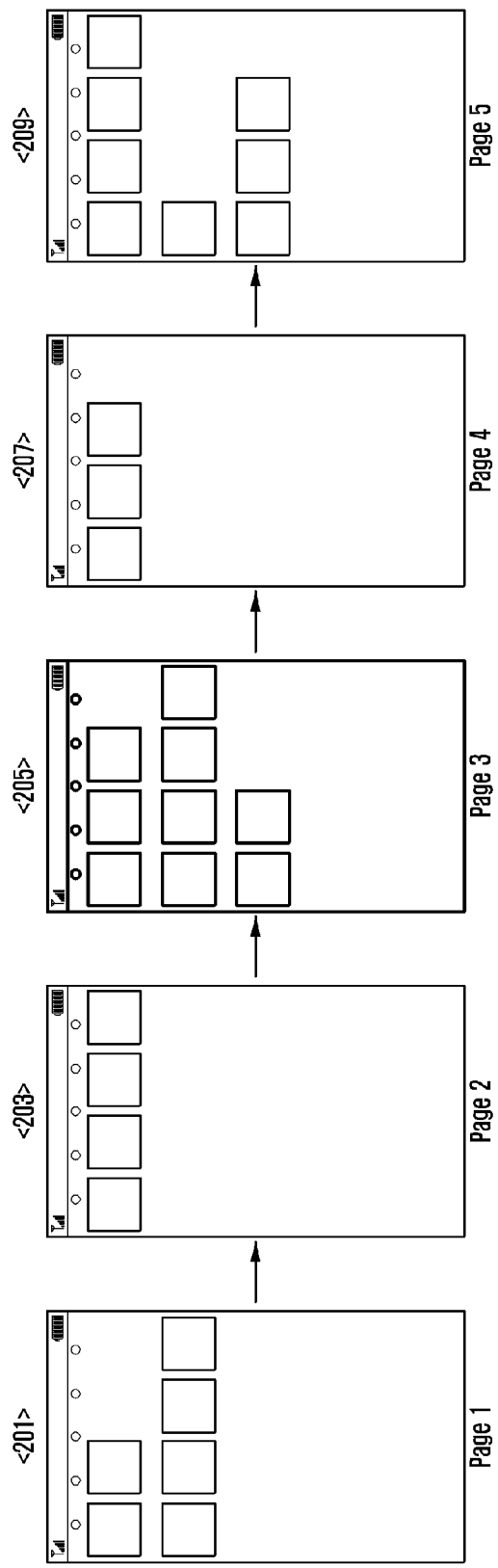
FIG. 2 depicts the configuration of the home screen in the touch-enabled device.

FIG. 2 depicts the configuration of the home screen in the touch-enabled device.

As shown, the home screen of the touch-enabled device may be composed of multiple pages. For example, the home screen in FIG. 2 includes five pages (pages 1 to 5 indicated by reference symbols 201 to 209), and one of the pages may be set as the current home screen according to a user request. For illustration purposes, page 3 indicated by reference symbol 205, among the five pages, is set as the current home screen.

Each page of the home screen may include a group of content items according to user settings. The content items may indicate shortcut icons for applications supporting functions of the touch-enabled device, widget icons for widgets, and folders.

Referring to FIG. 2, the touch-enabled device may display one of multiple pages as the current home screen according to user settings. The user may control page transitions by entering a preset interaction, i.e., a flick in a predetermined direction, on the current home screen. For example, assume that page 3 (reference symbol 205) is the current home screen. When the user enters, for example, a flick interaction in the right direction at a portion of page 3, page 3 is moved in the right direction and disappears, then page 2 (reference symbol 203) appears as a new current home screen. Such a page transition may be performed between pages of the home screen according to a user interaction. For example, when a user interaction for page transition is entered while one page of the home screen is being displayed, the previous or next page is displayed according to the direction of the user interaction.

In addition, the touch-enabled device supports the movement of a content item between pages during editing of the home screen. In an existing or known method of moving a content item between pages, the user has to select a content item to be moved in one page, move the content item to the end portion of the screen in the direction of the target page, hold the content item until the target page appears, and drop the content item at a desired location of the target page. Hence, in the existing method, the movement of a content item from one page to another page (several pages apart) may require a longer time, inconveniencing the user. For example, to move a content item from page 1 to page 5, the user may have to hold the content item and until page 5 appears on the screen.

To address the above problem, one embodiment of the present invention provides a new method which enables the user to move a content item between pages of the home screen through page transition in an easy and intuitive manner in order to enhance the level of usability and convenience during a editing mode of the home screen.

Figure 3:
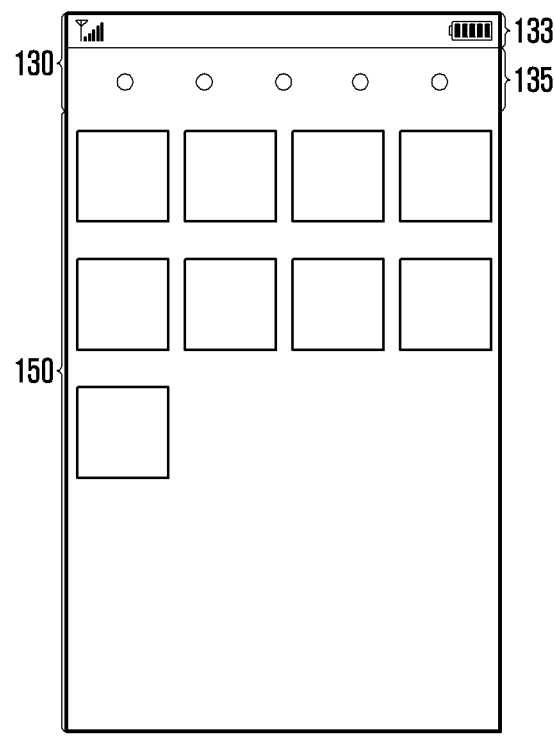
FIG. 3 is a screen representation of an interface supporting movement of a content item between pages.

FIG. 3 is a screen representation of an interface supporting the movement of a content item between pages in accordance with the present invention.

Referring to FIG. 3, the display unit 100 may divide the home screen into a transition region 130 and a content region 150.

The transition region 130 refers to a region through which an interaction for entering into a home screen editing mode is input. When a page transition interaction is generated in the transition region 130 according to a user interaction during a home screen editing mode, the control unit 300 detects the page transition interaction through the transition region 130 and controls an operation to move a content item between pages according to the page transition interaction.

In one embodiment, the transition region 130 may include a device indicator region 133 for providing status information of the touch-enabled device, and a page indicator region 135 for guiding the movement of a content item between pages and ease of identification. That is, the movement of a content item between pages may be facilitated through utilizing one or both of the device indicator region 133 and the page indicator region 135. Movement of a content item between pages using the transition region 130 is described in details later with reference to FIGS. 4-6.

The status information of the touch-enabled device may be provided in the device indicator region 133 as informational icons in the form of still or dynamic images, static or dynamic text, and the device indicator region 133 may display one or more informational icons. For example, to provide status information, the device indicator region 133 may display an icon indicating signal strength for communication, an icon indicting message reception, an icon indicating a ringtone setting (vibration/sound/mute), an icon indicating Bluetooth activation/deactivation, an icon indicating Wi-Fi activation/deactivation, an icon indicating remaining battery power, and an icon indicating the current time. The device indicator region 133 may further display various other icons. A different number of icons may be arranged in the device indicator region 133 according to usage situations of the touch-enabled device.

The page indicator region 135 may be configured corresponding to the pages allocated to the home screen. For example, when the home screen is composed of five pages as in FIG. 2, the page indicator region 135 may include five page items represented as small circles corresponding to the five pages, respectively. Hence, the user may select a page item in the page indicator region 135 and move to the page corresponding to the selected page item, and the moved page is then displayed as a new current home screen. When a user interaction like sweep is entered over the page items in the page indicator region 135, a page transition may be performed in sequence. In another embodiment, the transition region 130 may be operated using the device indicator region 133 only without the page indicator region 135.

The content region 150 is a region in which one or more content items are arranged to provide content. The content region 150 displays content items arranged in a page corresponding to the current home screen. As described before, the content items may indicate shortcut icons for applications supporting various functions of the touch-enabled device, widget icons for widgets, and folders.

Next, a description relating to the movement of a content item between pages through the transition region 130 during editing of the home screen is described with reference to FIGS. 4 to 6.

Figure 4:
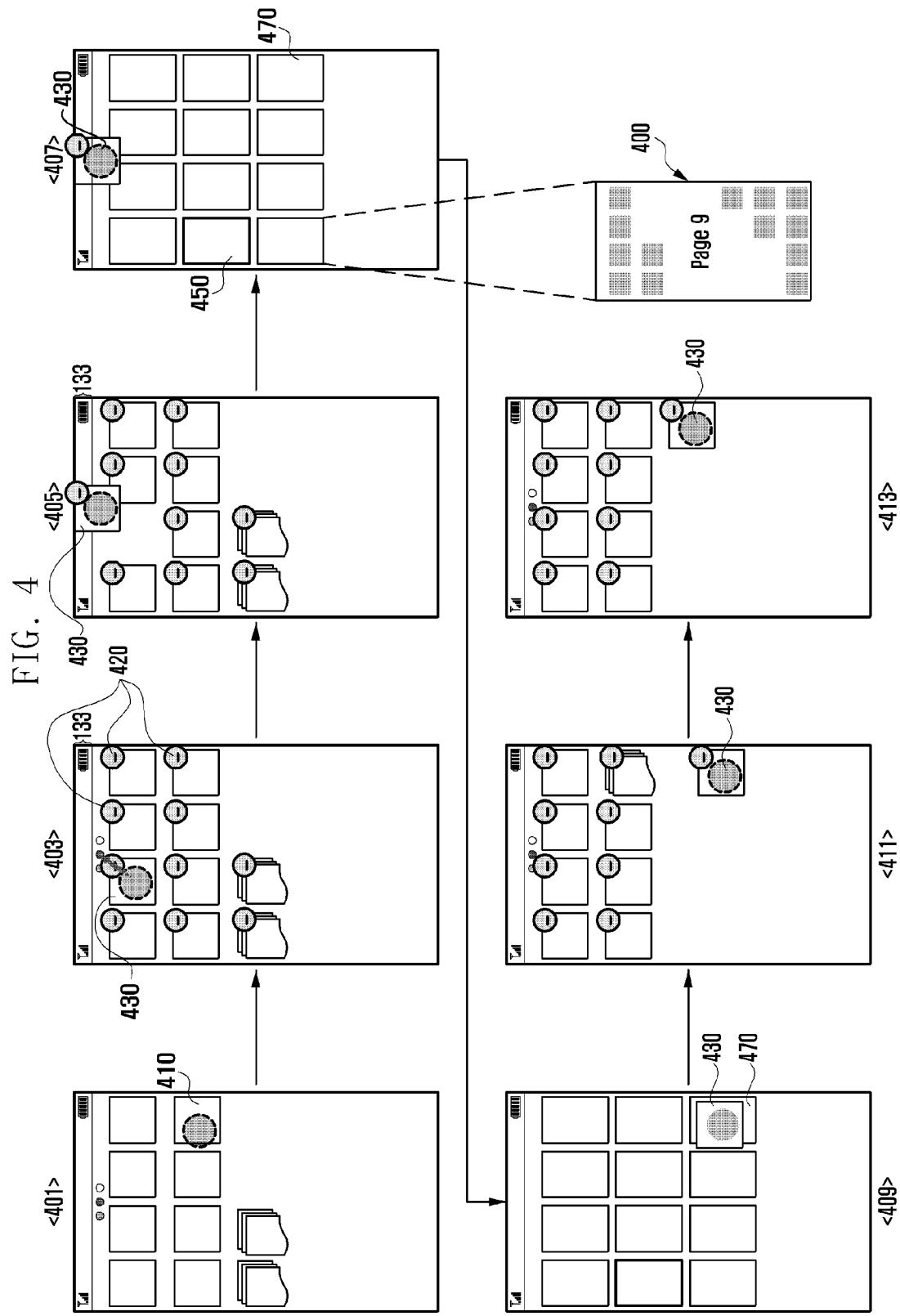
FIGS. 4 to 6 illustrate touch-based user interaction to move a content item between pages in the home screen.

FIG. 4 illustrates touch-based user interactions to move a particular content item between pages on the home screen of the touch-enabled device.

Referring to FIG. 4, the display unit 100 is assumed to display a specific page (for example, page 5) as the current home screen as indicated by reference symbol 401. The user may enter a preset interaction for entering into a home screen editing mode using a content item on the home screen. For example, in a state indicated by reference symbol 401, the user may enter an interaction for selecting a content item 410, holding the content item 410 for a preset time and releasing the content item 410.

Upon detection of the interaction through the home screen, the control unit 300 may control the display unit 100 to display an editing mode screen as indicated by reference symbol 403. Here, to indicate activation of the home screen editing mode, edit indicators 420 may be attached to individual content items in the home screen as indicated by reference symbol 403; the color of content items may be changed to a translucent color; or other intuitive means may be taken. In another embodiment, the movement of a content item between pages may be directly performed, without entering into the home screen editing mode, as described later.

In a state indicated by reference symbol 403, the user may enter a touch-based user interaction for moving a content item between pages in the home screen. For example, the user may enter an interaction for selecting a content item 430 and moving the content item 430 to the transition region 130 as indicated by reference symbol 405. Here, the device indicator region 133 of the transition region 130 is assumed to be utilized in FIG. 4. In FIG. 4, for illustrative purposes, it is assumed that the home screen is composed of 12 pages and each page includes a plurality of content items.

Hence, the user may move the selected content item 430 to the device indicator region 133. For example, as indicated by reference symbol 405, the user may place the content item 430 at a portion of the device indicator region 133 for a preset time period. Then, the control unit 300 may recognize the user interaction detected through the transition region 130 as a page transition interaction for entering into a transition mode to move a content item between pages during the home screen editing mode.

When the selected content item 430 is placed at a portion of the device indicator region 133 as indicated by reference symbol 405, the control unit 300 may display all the pages in the home screen. For example, the control unit 300 may create thumbnails corresponding to the respective page and display the thumbnails in the current home screen, as indicated by reference symbol 407. The thumbnails corresponding to the pages may be resized according to the display area of the display unit 100 and the number of pages. That is, in order the fit all 12 pages in the home screen, the size of respective thumbnail indicative of each page is adjusted. As the number of pages is assumed to be 12 in FIG. 4, twelve thumbnails may appear in the current home screen.

For easy distinction, the thumbnail corresponding to the page activated before entering into the transition mode (for example, the page 5 indicated by the content item 430) may be represented differently from the other thumbnails. For example, as indicated by reference symbol 407, the control unit 300 may highlight the thumbnail corresponding to the page (for example, page 5) containing the content item 430 to be moved. As indicated by reference symbol 400, each thumbnail displays a preview image of the corresponding page to increase the intuitiveness of moving a content item.

In a state in which the thumbnails are displayed, the user may enter an interaction for moving the selected content item 430 to a thumbnail 470 corresponding to the target page (for example, page 12) and holding the content item 430 as indicated by reference symbol 409. Then, the control unit 300 may display the page (page 12) corresponding to the thumbnail 470, and place the content item 430 at the hold point (i.e., location of thumbnail 470) as indicated by reference symbol 411.

In a state indicated by reference symbol 411, the user may enter an interaction for moving the content item 430 to a desired portion of the current page (page 12) and dropping the content item 430 as indicated by reference symbol 413. That is, the user may move the content item 430 to a desired location within the page. Then, the control unit 300 places the content item 430 at a portion around the release point as indicated by reference symbol 413.

Although not shown in FIG. 4, in a state indicated by reference symbol 409, the user may enter an interaction for moving the content item 430 to a thumbnail 470 corresponding to the target page (for example, page 12) and dropping the content item 430. That is, the user may directly move the content item 430 to the thumbnail 470 corresponding to page 12. Then, the control unit 300 may display the page (page 12) corresponding to the thumbnail 470, and automatically place the content item 430 at a suitable portion of the page or a default location as indicated by reference symbol 413. In other words, the state indicated by reference symbol 411 may be skipped according to user preference.

Although not shown in FIG. 4, in a state indicated by reference symbol 409, the user may enter an interaction for moving the content item 430 to a thumbnail 470 corresponding to the target page (for example, page 12) and dropping the content item 430. That is, the user may directly move the content item 430 to the thumbnail 470 corresponding to page 12. Then, the control unit 300 may place the content item 430 on the page corresponding to the thumbnail 470. Here, the state indicated by reference symbol 409 may be kept unchanged while the content item 430 disappears. Thereafter, the control unit 300 automatically displays the page corresponding to a thumbnail selected by a user interaction after the content item 430 disappears during a state indicated by reference symbol 409.

In the above description of FIG. 4, the movement of a single content item between pages is depicted using single-touch based interaction. However, it should be noted that the above teachings of the present invention is also possible to select multiple content items using a multi-touch based interaction and move the multiple content items between pages at once.

Figure 5:
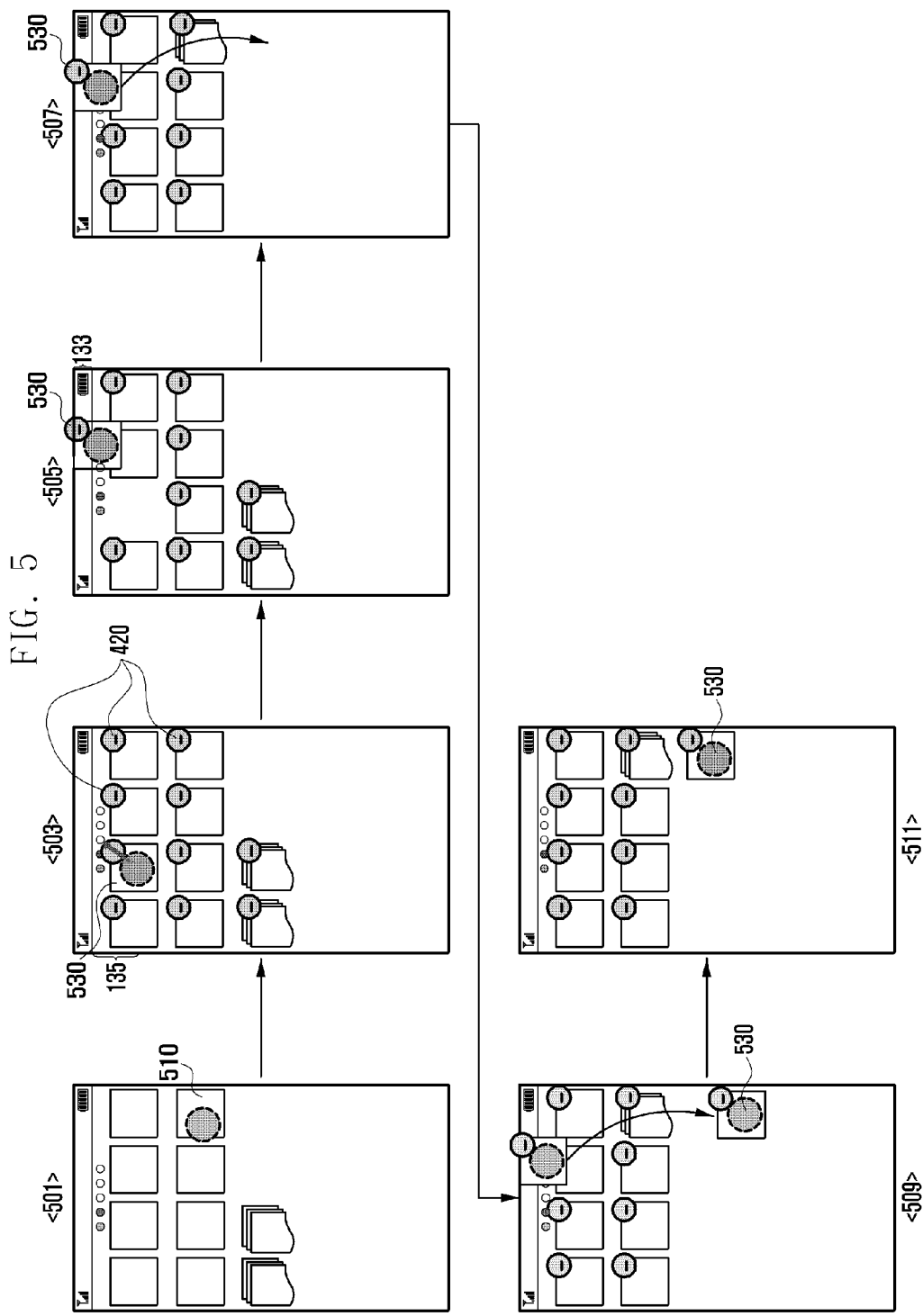

FIG. 5 illustrates touch-based user interaction to move a content item between pages in the home screen of the touch-enabled device in accordance with another embodiment of the present invention.

Referring to FIG. 5, the display unit 100 is assumed to display a specific page (for example, page 2) as the current home screen as indicated by reference symbol 501. The user may enter a preset interaction for entering into a home screen editing mode using a content item 510 in a state indicated by reference symbol 501. Then, the control unit 300 indicates activation of the home screen editing mode using edit indicators 420 as indicated by reference symbol 503. In an alternate embodiment, such an interaction for entering into the home screen editing mode may be skipped.

In a state indicated by reference symbol 503, the user may enter a touch-based user interaction for moving a content item between pages in the home screen. For example, the user may enter an interaction for selecting a content item 530 in a state indicated by reference symbol 503 and moving the content item 530 to the transition region 130 as indicated by reference symbol 505. Here, it is assumed that the page indicator region 135 of the transition region 130 is utilized in FIG. 5. In FIG. 5, it is assumed that the home screen is composed of five pages and five page items (a row of five circles) are shown in the page indicator region 135. Note that a row of circles did not reflect the number of pages in FIG. 5 as it disclosed a different embodiment.

Hence, the user may move the selected content item to a page item corresponding to the target page among the page items in the page indicator region 135. For example, as indicated by reference symbol 505, the user may place the content item 530 at a portion of the page item corresponding to page 5 (i.e., $5^{th}$ circle). Then, the control unit 300 may recognize the user interaction detected through the transition region 130 as a page transition interaction for entering into a transition mode to move a content item between pages during the home screen editing mode.

When the selected content item 530 is placed at a portion of the page item corresponding to page 5 in the page indicator region 135 as indicated by reference symbol 505, the control unit 300 may change the current home screen to the page (page 5) corresponding to the page item at which the content item 530 is placed as indicated by reference symbol 507.

In a state in which the new page (page 5) is displayed as indicated by reference symbol 507, the user may enter an interaction for moving the content item 530 to a desired portion of the current page (page 5) and dropping the content item 530 as indicated by reference symbol 509. That is, the user may move the content item 530 to a desired location in the page. Then, the control unit 300 places the content item 530 at a portion around the release point as indicated by reference symbol 511.

Although not shown in FIG. 5, in a state indicated by reference symbol 505, the user may enter an interaction for moving a content item over other page items in the page indicator region 135. In response to such a sweep interaction, the control unit 300 may perform page transitions according to the page items. For example, when the user moves the content item from the page item corresponding to page 5 to the pages items corresponding respectively to page 4, page 3, page 2 and page 1, the control unit 300 may perform page transitions from page 5 to page 4, from page 4 to page 3, from page 3 to page 2, and from page 2 to page 1 (the current home screen is changed accordingly). That is, the movement of a content item over the page items causes sequential transitions between pages corresponding to the page items. A content item may be directly moved from a page item corresponding to page 5 to a page item corresponding to page 1, resulting in an abrupt transition from page 5 to page 1.

In the above description of FIG. 5, the movement of a single content item between pages is depicted using single-touch based interaction. However, it should be noted that the above teachings can be applied to select multiple content items using multi-touch based interaction and move the multiple content items between pages at once.

Figure 6:
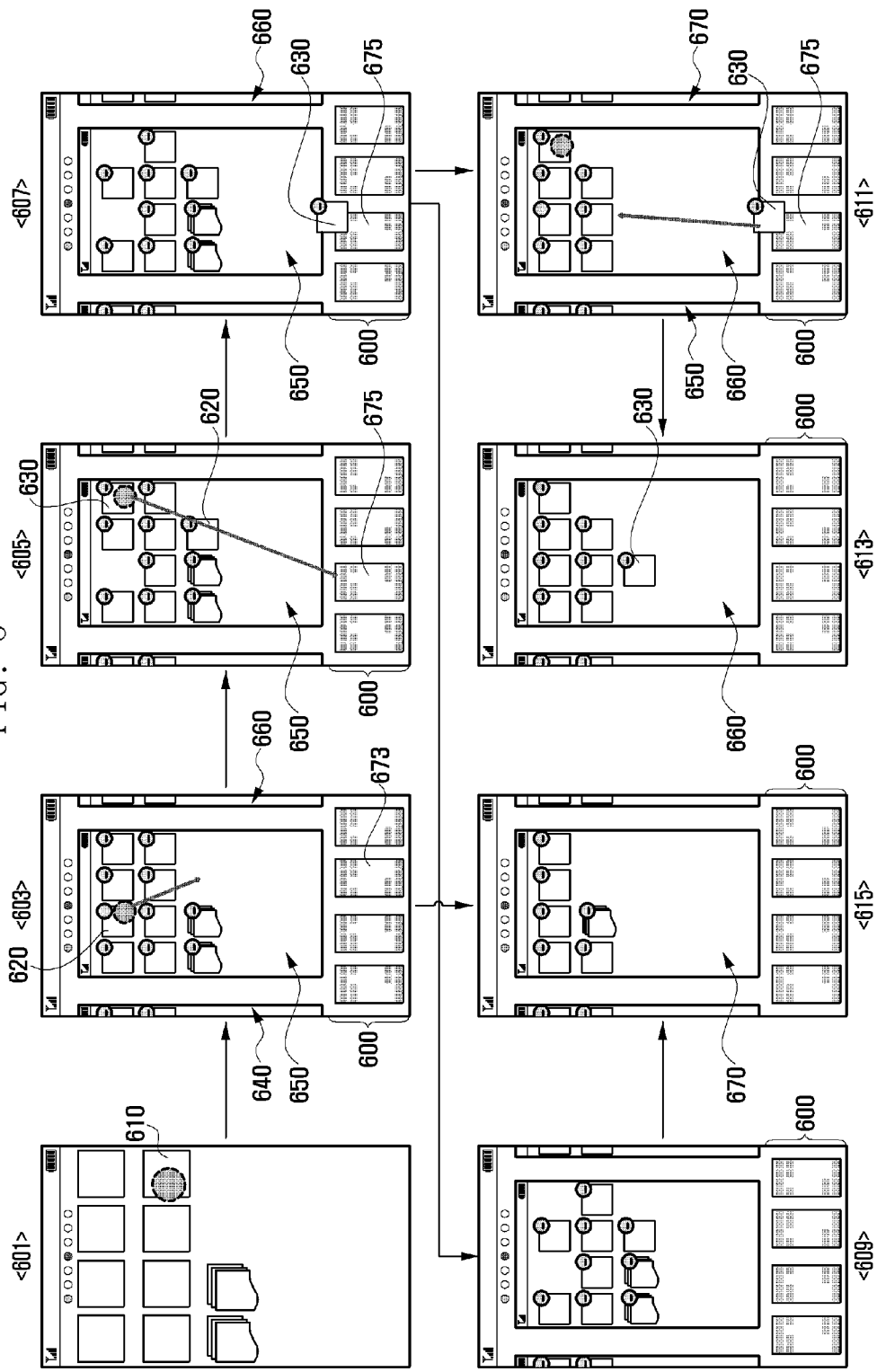

FIG. 6 illustrates touch-based user interaction to move a content item between pages in the home screen of the touch-enabled device in accordance with another embodiment of the present invention.

Referring to FIG. 6, the display unit 100 is assumed to display a specific page (for example, page 3) as the current home screen as indicated by reference symbol 601. The user may enter a preset interaction for entering into a home screen editing mode using a content item 610 in a state indicated by reference symbol 601. Upon detection of the interaction, the control unit 300 indicates activation of the home screen editing mode using edit indicators 420 as indicated by reference symbol 603.

For example, in the editing mode, pages may be resized as indicated by reference symbol 603. Here, the current page is resized into a page 650. For the transition mode, the previous and next pages are also resized respectively as pages 640 and 660, and the resized pages 640 and 660 are displayed in part together with the resized page 650.

As indicated by reference symbol 603, a page region 600 is provided at a portion (for example, lower end) of the screen together with the resized pages 640, 650 and 660. A number of thumbnails may be shown in the page region 600 to display preview images of the individual pages. In FIG. 6, it is assumed that four thumbnails are provided in the page region 600. In the page region 600, the thumbnails may be ordered with respect to the page represented in the current screen (for example, the page indicated by reference symbol 650). For example, the thumbnail corresponding to the page indicated by reference symbol 650 may be the leftmost entry in the page region 600, and the thumbnails corresponding to the subsequent pages may be next entries in sequence from the leftmost entry. Here, the page region 600 may correspond to the transition region 130 described before. Hence, the transition region 130, the device indicator region 133, the page indicator region 135 and the page region 600 may be regions demarcated for ease of description.

In a state indicated by reference symbol 603, the user may enter a touch-based user interaction for moving a content item to another portion within the home screen. For example, the user may enter an interaction for moving a content item 620 to another location. Upon detection of the interaction, the control unit 300 places the content item 620 at a different location as indicated by reference symbol 605.

In a state indicated by reference symbol 603, the user may enter a user interaction to perform thumbnail transitions in the page region 600. For example, the user may enter an interaction like flick or sweep to scroll the thumbnails in the page region 600. Then, the control unit 300 may shift the thumbnails in the left or right direction and display the resulting thumbnails in the page region 600.

In a state indicated by reference symbol 603, the user may enter a user interaction to perform page transition. For example, the user may enter a user interaction like tap to select a thumbnail 673 in the page region 600 in a state indicated by reference symbol 405. Then, the control unit 300 may replace the resized page 650 with a resized page 670 corresponding to the thumbnail 673 as indicated by reference symbol 615. Here, when the resized page 650 is a reduced version of page 3 and the thumbnail 673 corresponds to page 5, the user interaction may be considered to have caused a page transition from page 3 to page 5. This page transition may facilitate the movement of a content item between pages.

In a state indicated by reference symbol 605, the user may enter a touch-based user interaction for moving a content item between pages in the home screen. For example, the user may enter an interaction for selecting a content item 630 in a state indicated by reference symbol 605 and moving the content item 630 to a thumbnail 675 in the page region 600 as indicated by reference symbol 607. Here, the user may enter an interaction for moving the content item 630 to the thumbnail 675 corresponding to a target page (for example, page 4) and dropping or releasing the content item 630 thereon. Then, the control unit 300 may place the content item 630 on the page corresponding to the thumbnail 675 at the release point as indicated by reference symbol 609. Here, as indicated by reference symbol 609, the current page may be kept unchanged except for the content item 630 being removed from the current page.

In a state indicated by reference symbol 607, the user may enter a touch-based user interaction for moving a content item between pages in the home screen. For example, the user may enter an interaction for selecting a content item 630, moving the content item 630 to a thumbnail 675 in the page region 600 and holding the content item 630 as indicated by reference symbol 607. Here, the user may enter an interaction for moving the selected content item 630 to the thumbnail 675 corresponding to a target page (for example, page 4) and holding the content item 630 thereon. Then, as indicated by reference symbol 611, the control unit 300 automatically display a resized page 660, which is a version of the page (page 4) corresponding to the thumbnail 675, and place the content item 630 at the hold point (around the thumbnail 675).

In a state indicated by reference symbol 611, the user may enter an interaction for moving the content item 630 to a portion of the resized page 660 and dropping the content item 630 as indicated by reference symbol 613. That is, the user may move the content item 630 to a desired location and release the content item 630 thereat. Then, the control unit 300 places the content item 630 at a portion around the release point as indicated by reference symbol 613.

Figure 7:
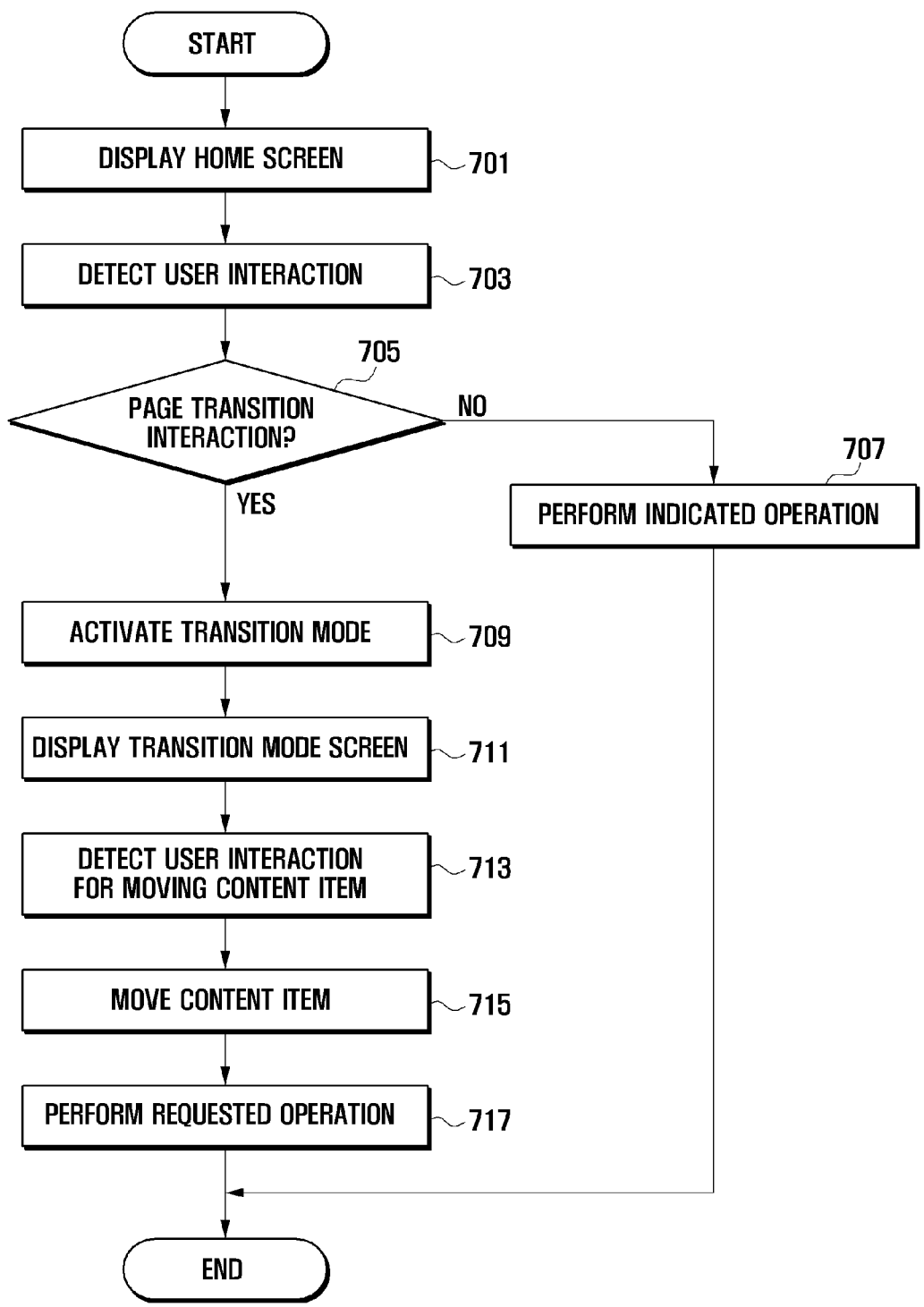
FIG. 7 is a flowchart of a procedure for moving a content item between pages in the touch-enabled device according to another exemplary embodiment of the present invention.

FIG. 7 is a flowchart of a procedure for moving a content item between pages in the touch-enabled device.

Referring to FIG. 7, the control unit 300 controls the display unit 100 to display the home screen (701). For example, the control unit 300 may set a page having multiple content items as the current home screen.

The control unit 300 detects a user interaction during a display of the home screen (703). For example, when the user enters a touch-based user interaction on the home screen, the display unit 100 may generate an input signal corresponding to the user interaction and send the input signal to the control unit 300, which then receives the input signal to thereby recognize the user interaction. The user may enter various user interactions using the touch-based input interface of the touch-enabled device. Here, the user interactions may include touch gestures such as tap, drag, drag and drop, sweep and flick, and may be single-touch or multi-touch gestures.

The control unit 300 checks whether the user interaction is a page transition interaction for the movement of a content item between pages or a regular control interaction (705). To achieve this, the control unit 300 examines whether the user interaction has followed a preset rule for the movement of a content item between pages. For example, when the user interaction is related to selecting a content item on the home screen and moving the content item to the device indicator region 133 of the transition region 130 as described in connection with FIG. 4, the control unit 300 may regard the user interaction as a page transition interaction. As another example, when the user interaction is related to selecting a content item on the home screen and moving the content item to the page indicator region 135 of the transition region 130 as described in connection with FIG. 5, the control unit 300 may regard the user interaction as a page transition interaction. As another example, when the user interaction is related to selecting a content item on the home screen and holding the content item for a preset time (for example, touch and hold) as described in connection with FIG. 6, the control unit 300 may regard the user interaction as a page transition interaction. Other types of user interactions may also be specified as a page transition interaction.

When the user interaction is a regular control interaction, the control unit 300 performs a control operation indicated by the user interaction (707). For example, when the user interaction corresponds to a double tap on a content item, the control unit 300 may execute an application mapped to the content item and control application screen display.

When the user interaction is a page transition interaction for the movement of a content item between pages, the control unit 300 activates the transition mode (709) and controls screen display for the transition mode (711). Here, the control unit 300 may control screen display in response to a page transition interaction as described before in connection with FIGS. 4 to 6. For example, as depicted in connection with FIG. 4, the control unit 300 may represent all the pages on the current home screen in the form of thumbnails. As another example, as depicted in connection with FIG. 5, the control unit 300 may perform page transition to a page indicated by the page indicator region 135. As another example, as depicted in connection with FIG. 6, the control unit 300 may reduce the current page through resizing and display thumbnails corresponding to the pages (the thumbnails are ordered in sequence with respect to the current page) in a region of the screen in addition to the resized page.

The control unit 300 detects a user interaction for moving a selected content item to a target page during the transition mode (713), and moves the content item to the target page and places the content item at a suitable portion thereof (715). Here, as described before in connection with FIGS. 4 to 6, according to a user interaction in a state in which the transition mode screen is displayed, the control unit 300 may move a selected content item to a target page indicated by the user interaction and place the content item at a suitable portion of the target page.

For example, in a state in which all the pages are represented as thumbnails as depicted in connection with FIG. 4, when the user enters an interaction for moving a content item to a thumbnail corresponding to a target page and releasing the content item, the control unit 300 may move the content item to the target page corresponding to the thumbnail at the release point. As another example, in a state in which all the pages are represented as thumbnails as depicted in connection with FIG. 4, when the user enters an interaction for moving a content item to a thumbnail corresponding to a target page and holding the content item, the control unit 300 may perform a page transition to the target page and move the content item to a location of the target page at the release point. As another example, as depicted in connection with FIG. 5, when the user enters an interaction for moving a content item to a target page and releasing the content item, the control unit 300 may perform page transition to the target page and move the content item to the release point. As another example, as depicted in connection with FIG. 6, in a state in which thumbnails corresponding to the pages are presented in the page region 600, when the user enters an interaction for moving a selected content item to a thumbnail and releasing the content item thereon, the control unit 300 may move the content item to the page corresponding to the thumbnail at the release point. As another example, as depicted in connection with FIG. 6, in a state in which thumbnails corresponding to the pages are presented in the page region 600, when the user enters an interaction for moving a selected content item to a thumbnail and holding the content item thereon, the control unit 300 may perform a page transition to a target page corresponding to the thumbnail and move the content item to the release point in the target page.

After content item movement, the control unit 300 performs a requested operation (717). For example, the control unit 300 may repeat the movement of a content item between pages according to a user request. According to a user request, the control unit 300 may terminate the transition mode, move a content item within the current page, change the name of a content item, or delete a content item.

According to the present invention, the method for moving a content item between pages in the home screen may be implemented as computer programs and may be stored in various computer readable storage media. The computer readable storage media may store program instructions, data files, data structures and combinations thereof. The program instructions may include instructions developed specifically for the present invention and existing general-purpose instructions.

The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters.

The description of the various embodiments is to be construed as exemplary only and does not describe every possible instance of the invention. Therefore, it should be understood that various changes may be made and equivalents may be substituted for elements of the invention.

Although exemplary embodiments of the present invention have been described in detail hereinabove, it should be understood that many variations and modifications of the basic inventive concept described herein will still fall within the spirit and scope of the exemplary embodiments of the present invention as defined in the appended claims.

What is claimed is:

1. A home screen management method in a touch-enabled device, comprising:
    displaying on a touchscreen a current home screen including content items and a transition region indicating a position of the current home screen relative to one or more other home screens;
    in response to a first interaction with the transition region of the touchscreen, displaying a transition mode screen showing icons, displayed as thumbnails, representative of each of the home screens;
    in response to a second interaction of dragging at least one of the content items from the current home screen to an icon representing a target home screen in the transition region, displaying the one or more other home screens as a target home screen on a full area of the touchscreen; and
    setting at least one content item to a desired location in the target home screen.

2. The method of claim 1, further comprising:
    detecting a touch input on the touchscreen and differentiating the touch input between the first interaction and a regular control interaction.

3. The method of claim 2, wherein the second interaction is a movement of the at least one content item to a particular icon and a hold of the at least one content item over the particular icon.

4. The method of claim 1, wherein when the first interaction comprises at least one of
    detecting the least one content item on the current home screen being moved to a transition region displayed on the touchscreen,
    detecting a touch input on the at least one content item that is held for a preset time, and
    detecting a touch gesture for displaying the transition mode screen.

5. The method of claim 4, wherein the transition mode screen comprises a thumbnail screen, and the icons are displayed as thumbnails.

6. The method of claim 5, wherein setting the at least one content item to the displayed target home screen comprises detecting movement of the at least one content item to one of the thumbnails.

7. The method of claim 5, wherein
    the second interaction is a movement of the at least one content item to a particular thumbnail and a hold of the at least one content item over the particular thumbnail, further comprising:
    detecting movement of the at least one content item to a portion of the displayed target home screen at a location where the second interaction is released.

8. The method of claim 1, wherein the transition mode screen comprises a primary region displaying the current home screen and an icon region displaying icons.

9. The method of claim 8, wherein the second interaction is a movement of the at least one content item to a particular icon and a hold of the at least one content item over the particular icon.

10. The method of claim 9, wherein setting the at least one content item to the displayed target home screen further comprises:
    detecting movement of the at least one content item to a location in the displayed target home screen where the second interaction is released.

11. A touch-enabled device comprising:
    a touchscreen; and
    a control unit configured to:
        display on the touchscreen a current home screen including content items and a transition region indicating a position of the current home screen relative to one or more other home screens,
        in response to a first interaction with the transition region of the touchscreen, display a transition mode screen showing icons, displayed as thumbnails, representative of each of the home screens,
        in response to a second interaction of dragging at least one of the content items from the current home screen to an icon representing a target home screen in the transition region, displaying the one or more other home screens as a target home screen on a full area of the touchscreen, and
        setting the at least one content item to a desired location in the displayed target home screen.

12. The device of claim 11, wherein the current home screen comprises a transition region for activating display of the transition mode screen via the first interaction.

13. The device of claim 12, wherein the transition region is located at one region of the current home screen and comprises at least one of a device indicator region, a page indicator region and a page region.

14. The device of claim 11, wherein the transition mode screen comprises a thumbnail screen, and the icons are thumbnails.

15. The device of claim 14, wherein setting the at least one content item to the target home screen comprises detecting movement of the at least one content item to a particular thumbnail indicating the target home screen, and detecting release of the at least one content item from the second interaction to of the particular thumbnail.

16. The device of claim 11, wherein the current home screen comprises an icon region including the icons representative of the home screen.

17. The device of claim 16, wherein setting the at least one content item to the displayed target home screen comprises:
   detecting movement of the at least one content item to a particular icon corresponding to the target home screen, and detecting release of the second interaction at a location in the displayed target home screen.

18. A home screen management method in a touch-enabled device, comprising:
   displaying on a touchscreen a current home screen including content items and indicators, each representing a home screen and showing a position of the current home screen relative to one or more other home screens;
   in response to a first interaction wherein at least one content item is dragged to one of the indicators, displayed as thumbnails, displaying a target home screen corresponding to the one or more other home screens and the one of the indicators on a full area of the touchscreen; and
   in response to a second interaction, setting the at least one content item to a desired location of the displayed target home screen.

19. A touch-enabled device comprising:
   a touchscreen; and
   a control unit configured to:
      display on the touchscreen a current home screen of a plurality of home screens, each containing at least one content item,
      in response to detecting a preset interaction, display a plurality of thumbnails, each thumbnail corresponding to one of the plurality of home screens,
      in response to a first interaction wherein at least one content item of the current home screen is dragged to one thumbnail of the plurality of thutnbnails, display a target home screen corresponding to the one thumbnail, and
      in response to a second interaction, set the at least one content item to a desired location of the displayed target home screen.

20. The touch-enabled device of claim 19, wherein displaying the plurality of thumbnails comprises: reducing a size of the current home screen and display a portion of a next home screen and a previous home screen, the control unit further configured to:
   display the plurality of thumbnails in a region of the touchscreen made available by the reducing the size of the current home screen, wherein the region is scrollable to display the plurality of thumbnails.

\* \* \* \* \*

UNITED STATES PATENT AND TRADEMARK OFFICE
CERTIFICATE OF CORRECTION

PATENT NO.        : 8,938,673 B2                                              Page 1 of 1
APPLICATION NO.   : 13/241807
DATED             : January 20, 2015
INVENTOR(S)       : Lee et al.

It is certified that error appears in the above-identified patent and that said Letters Patent is hereby corrected as shown below:

In the claims

Column 13, Claim 1, Lines 55-56 should read as follows:
--...in the displayed target...--

Column 13, Claim 4, Line 66 should read as follows:
--...at least one of:...--

Column 14, Claim 4, Line 1 should read as follows:
--...the at least one...--

Column 14, Claim 7, Lines 15-16 should read as follows:
--...wherein: the second interaction...--

Column 15, Claim 15, Line 3 should read as follows:
--...to the particular thumbnail...--

Column 15, Claim 18, Lines 22-23 should read as follows:
--...screens and one of...--

Column 16, Claim 19, Line 12 should read as follows:
--...plurality of thumbnails, display...--

Column 16, Claim 20, Line 24 should read as follows:
--...available by reducing the...--

Signed and Sealed this
Fifth Day of May, 2015

Michelle K. Lee
*Director of the United States Patent and Trademark Office*